(12) United States Patent
Payton

(10) Patent No.: US 10,228,114 B1
(45) Date of Patent: Mar. 12, 2019

(54) MAGNETIC LIGHT STRAND CLIP DEVICE

(71) Applicant: Brenda Payton, Hobbs, NM (US)

(72) Inventor: Brenda Payton, Hobbs, NM (US)

( * ) Notice: Subject to any disclaimer, the term of this patent is extended or adjusted under 35 U.S.C. 154(b) by 46 days.

(21) Appl. No.: 15/341,348

(22) Filed: Nov. 2, 2016

(51) Int. Cl.
| | |
|---|---|
| *F21V 21/096* | (2006.01) |
| *F16M 13/02* | (2006.01) |
| *F16B 1/00* | (2006.01) |
| *F21V 21/088* | (2006.01) |
| *F21S 4/10* | (2016.01) |

(52) U.S. Cl.
CPC .............. *F21V 21/096* (2013.01); *F16B 1/00* (2013.01); *F16M 13/022* (2013.01); *F21S 4/10* (2016.01); *F21V 21/088* (2013.01); *F16B 2001/0035* (2013.01)

(58) Field of Classification Search
USPC ... 248/683, 50, 51, 52, 58, 62, 63, 65, 67.7, 248/68.1, 70, 74.1, 74.2, 74.4, 206.5, 248/316.1, 316.7, 229.26, 229.16, 231.81; 362/398, 654
See application file for complete search history.

(56) References Cited

U.S. PATENT DOCUMENTS

| | | | | |
|---|---|---|---|---|
| 1,070,921 | A * | 8/1913 | Saltiel ..................... | E04C 5/168 264/35 |
| 2,704,302 | A * | 3/1955 | Budd ....................... | F16L 3/13 128/DIG. 26 |
| D188,323 | S | 7/1960 | Johnson | |
| 3,239,179 | A | 3/1966 | Margulis | |
| 4,588,153 | A * | 5/1986 | Boston .................... | F16B 47/00 174/175 |
| 4,688,829 | A * | 8/1987 | Shioda ................... | F16L 41/021 248/73 |
| 4,805,479 | A * | 2/1989 | Brightwell .............. | F16C 1/105 74/502.4 |
| 4,830,321 | A * | 5/1989 | Irie ......................... | B42F 9/00 248/206.5 |
| 4,985,817 | A * | 1/1991 | Yale ........................ | F21L 14/02 248/206.5 |
| 5,039,047 | A * | 8/1991 | Pitzo ....................... | A47G 1/17 248/206.5 |
| 5,110,078 | A * | 5/1992 | Gary ...................... | F21V 19/0005 248/206.2 |
| 5,275,367 | A * | 1/1994 | Frye ....................... | F16B 47/003 248/205.3 |
| 5,562,269 | A * | 10/1996 | Protz, Jr. ................. | F16L 3/12 248/205.5 |

(Continued)

*Primary Examiner* — Terrell L McKinnon
*Assistant Examiner* — Michael McDuffie

(57) ABSTRACT

A magnetic light strand clip device including a base with an internal removable magnet to couple and uncouple the base from a metal surface, such as a metal roof. A pair of diametrically opposed U-shaped first clips and U-shaped second clips are disposed on the front side proximal right and left sides and top and bottom sides, respectively, of the base. Each of the pair of first and second clips has a central slot open crosswise or lengthwise, respectively, relative the base for securing a respective string of lights or a rope light therein. The front portion of each first clip is wider than that of each second clip. Each second clip rear portion is circular. Each first clip rear portion has a circular external portion adjacent the front portion and a rectangular internal portion. Each second clip rear portion has a larger diameter than that of each first clip.

10 Claims, 4 Drawing Sheets

(56) References Cited

U.S. PATENT DOCUMENTS

| | | | |
|---|---|---|---|
| 6,282,860 B1 * | 9/2001 | Ramirez | E04C 5/167 52/677 |
| 6,520,661 B1 * | 2/2003 | Hill | F21V 21/096 362/249.01 |
| 6,663,316 B1 * | 12/2003 | Harris | E04C 5/167 404/136 |
| 7,469,515 B2 * | 12/2008 | Minor | E04C 5/167 403/397 |
| 7,607,618 B2 * | 10/2009 | Mori | H02G 3/32 248/51 |
| 7,914,185 B2 | 3/2011 | Moore | |
| 8,308,323 B2 * | 11/2012 | Holland | F21S 4/10 362/391 |
| 8,403,278 B1 * | 3/2013 | Kasbohm | F41C 33/06 211/64 |
| 8,506,136 B1 | 8/2013 | Herdt | |
| 9,252,581 B2 | 2/2016 | Stechmann | |
| 2004/0056158 A1 * | 3/2004 | Stuart | F16L 3/13 248/74.2 |
| 2006/0279958 A1 | 12/2006 | Cline et al. | |
| 2011/0084039 A1 * | 4/2011 | Walters | A47F 7/0028 211/85.13 |
| 2013/0221173 A1 | 8/2013 | Glover | |

* cited by examiner

MAGNETIC LIGHT STRAND CLIP DEVICE

BACKGROUND OF THE INVENTION

Various types of hanging devices, such as nails, hooks, and other hanging aids for supporting ornamental decorations, are known in the prior art. However, what is needed is a magnetic light strand clip device having a base repositionable on a metal surface, such as a metal roof or metal siding, from a first position to hang strings of lights to a second position to hang rope lights. In the first position, a top side of the base of each of a plurality of aligned magnetic light strand clip devices is horizontally positioned on the metal surface and a central slot of each of a pair of first clips being aligned horizontally on the metal surface in order to horizontally hang and display a string of lights. In the second position, the top side of the base of each of a plurality of aligned magnetic light strand clip devices is repositioned to a vertical position on the metal surface and a central slot of each of a pair of second clips being aligned horizontally on the metal surface in order to horizontally hang and display a rope light.

FIELD OF THE INVENTION

The present invention relates to hanging devices, and more particularly, to a magnetic light strand clip device.

SUMMARY OF THE INVENTION

The general purpose of the present magnetic light strand clip device, described subsequently in greater detail, is to provide a magnetic light strand clip device which has many novel features that result in a magnetic light strand clip device which is not anticipated, rendered obvious, suggested, or even implied by prior art, either alone or in combination thereof.

To accomplish this, the present magnetic light strand clip device includes a base having a removable magnet centrally disposed therein to couple and uncouple the base from a metal surface, such as a metal roof, a metal eave, or metal siding. A pair of diametrically opposed U-shaped first clips and a pair of diametrically opposed U-shaped second clips are disposed on the front side proximal right and left sides and top and bottom sides, respectively, of the base. Each of the pair of first clips and the pair of second clips has a central slot for securing a respective string of lights or a rope light therein, with the central slot being disposed between has a first arm perpendicular to the front side and a second arm parallel to the first arm. A rear portion and the front portion of the central slot of each of the first clips are open crosswise relative the base from the right side to the left side while, in contrast, the rear portion and the front portion of the central slot of each of the second clips are open lengthwise relative the base from the top side to the bottom side. The front portion of the central slot of each of the pair of first clips has a width greater than a width of the front portion of the central slot each of the pair of second clips. The rear portion of each of the pair of second clips is circular. The rear portion of each of the pair of first clips has a circular external portion directly adjacent the front portion and a rectangular internal portion. The rear portion of each of the pair of second clips has a diameter greater than a diameter of the external portion of the rear portion of each of the pair of the first clips.

In use, a plurality of the devices are aligned and spaced apart on the metal surface either in a first position or a second position to hang and display the entire length of a string of lights or a rope light. In the first position, a top side of the base of each of a plurality of aligned magnetic light strand clip devices is horizontally positioned on the metal surface and a central slot of each of a pair of first clips being aligned horizontally on the metal surface in order to horizontally hang and display a string of lights. In the second position, the top side of the base of each of a plurality of aligned magnetic light strand clip devices is repositioned to a vertical position on the metal surface and a central slot of each of a pair of second clips being aligned horizontally on the metal surface in order to horizontally hang and display a rope light.

The instant magnetic light strand clip eliminates the need to drill holes and insert screws to attach conventional wires to hang a strand of lights, which can mar or damage the structure to which the wire are being attached, and reduces the time and effort involved in hanging a strand of lights. The device also eliminates the need to locate and fumble with adhesive tape, stapes, screws, nails, and tacks which are used each year to hang exterior decorative lights. The device is provided in a wide range of colors for matching the device to the exterior paint of a home.

Thus has been broadly outlined the more important features of the present magnetic light strand clip device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
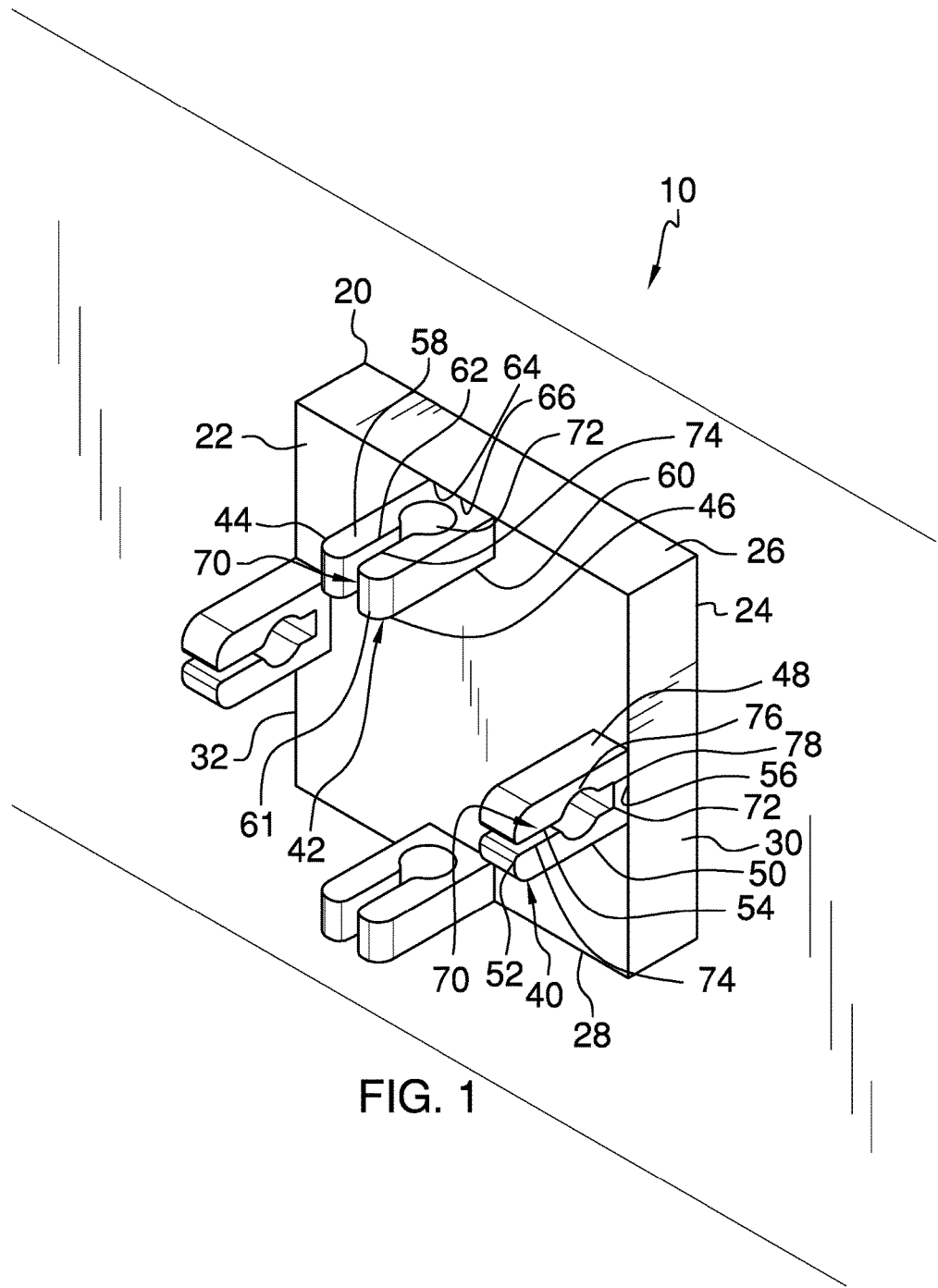
FIG. 1 is an isometric view.

With reference now to the drawings, and in particular FIGS. 1 through 6 thereof, an example of the instant magnetic light strand clip device employing the principles and concepts of the present magnetic light strand clip device and generally designated by the reference number 10 will be described.

Referring to FIGS. 1 through 6 the present magnetic light strand clip device 10 provided for hanging strands of decorative lights, including strings of lights and rope lights, from a metal roof is illustrated. The magnetic light strand clip device 10 includes a base 20. The base 20 has a front side 22, a rear side 24, a top side 26, a bottom side 28, a right side 30, and a left side 32. The base 20 has a removable magnet 36 centrally disposed therein. The magnet 36 is provided to permit the base 20 to couple to and uncouple from a metal surface. The magnet 36 has a length at least one-half of a length of the top side 26 of the base and a width at least one-half of a width of the top side 26 in order to provide sufficient magnetic attraction for a stable attachment of the base 20 to the metal surface.

A pair of U-shaped first clips 40 is disposed on the front side 22. One of each of the pair of first clips 40 is centrally disposed proximal the respective right side 30 and left side 32 of the base 20. The pair of first clips 40 is aligned with each other. A pair of U-shaped second clips 42 is also disposed on the front side 22. One of each of the pair of second clips 42 is disposed proximal the respective top side 26 and bottom side 28 of the base 20. The pair of second clips 42 is also aligned with each other.

Each of the pair of first clips 40 and the pair of second clips 42 has a first arm 44 perpendicular to the front side 22 and a second arm 46 parallel to the first arm 44. Each of the pair of first clips 40 has an upper side 48, a lower side 50 parallel to the upper side 48, a forward side 52, an interior side 54, and a rearward side 56. Each of the second clips 42 has an upper end 58, a lower end 60 parallel to the upper end 58, a forward end 61, an interior end 62, and a rearward end 64. A connection segment 66 is disposed between the first arm 44 and the second arm 46 of each of the pair of first clips 40 and the pair of second clips 42 at the respective rearward side 56 and rearward end 64 thereof. The upper side of each of the second clips 42 is parallel to the top side 26 of the respective base 20. A central slot 70 is continuously disposed along the respective interior side 54 and interior end 62 of the first arm 44 and the second arm 46 in a position between the respective forward side 52 and forward end 60 of each of the first arm 44 and second arm 46 and the connection segment 66 of each of the pair of first clips 40 and the pair of second clips 42. The central slot 70 has a rear portion 72 directly adjacent the connection segment 66 and a front portion 74 continuously disposed between the respective forward side 52 and forward end 60 and the rear portion 74. The rear portion 72 and the front portion 74 of the central slot 70 of each of the first clips 40 are open from the right side 30 to the left side 32. The rear portion 72 and the front portion 74 of the central slot 70 of each of the second clips 42 are open from the top side 26 to the bottom side 28.

The front portion 74 of the central slot 70 of each of the pair of first clips 40 has a width greater than a width of the front portion 74 of the central slot 70 each of the pair of second clips 42. The rear portion 72 of each of the pair of second clips 42 is circular. The rear portion 72 of each of the pair of first clips 40 has a circular external portion 76 directly adjacent the front portion 74 and a rectangular internal portion 78. The rear portion 72 of each of the pair of second clips 42 has a diameter greater than a diameter of the external portion 76 of the rear portion 72 of each of the pair of the first clips.

Figure 6:
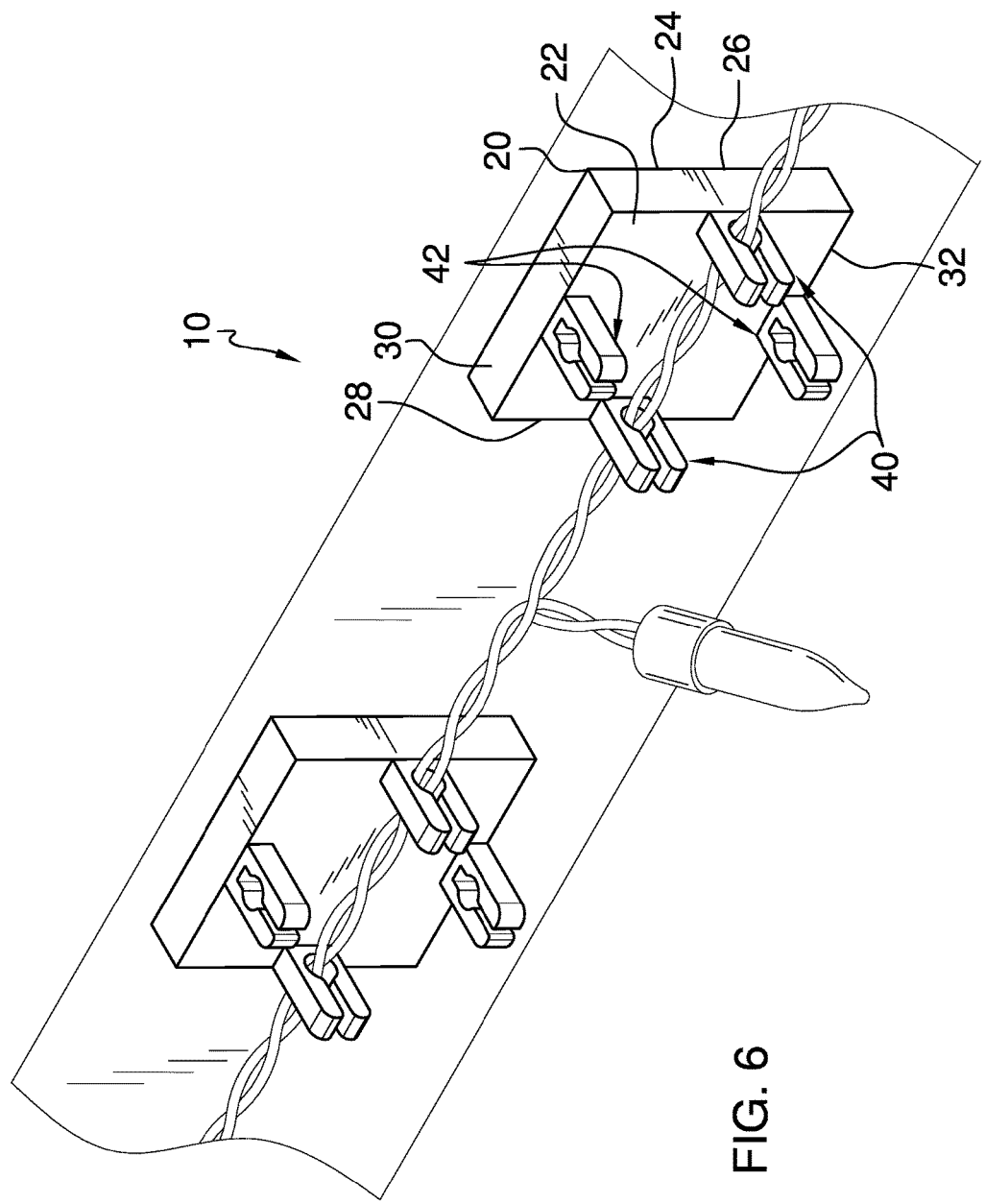
FIG. 6 is an in-use isometric view illustrating a pair of the magnetic holders disposed on metal siding and supporting a strand of lights.

The base 20 is repositionable upon the metal surface from a first position to a second position. The top and bottom sides 26, 28 of the base 20 are oriented horizontally on the metal surface in the first position, as shown in FIG. 1. The top and bottom sides 26, 28 are oriented vertically on the metal surface in the second position, as shown in FIG. 6.

Figure 2:
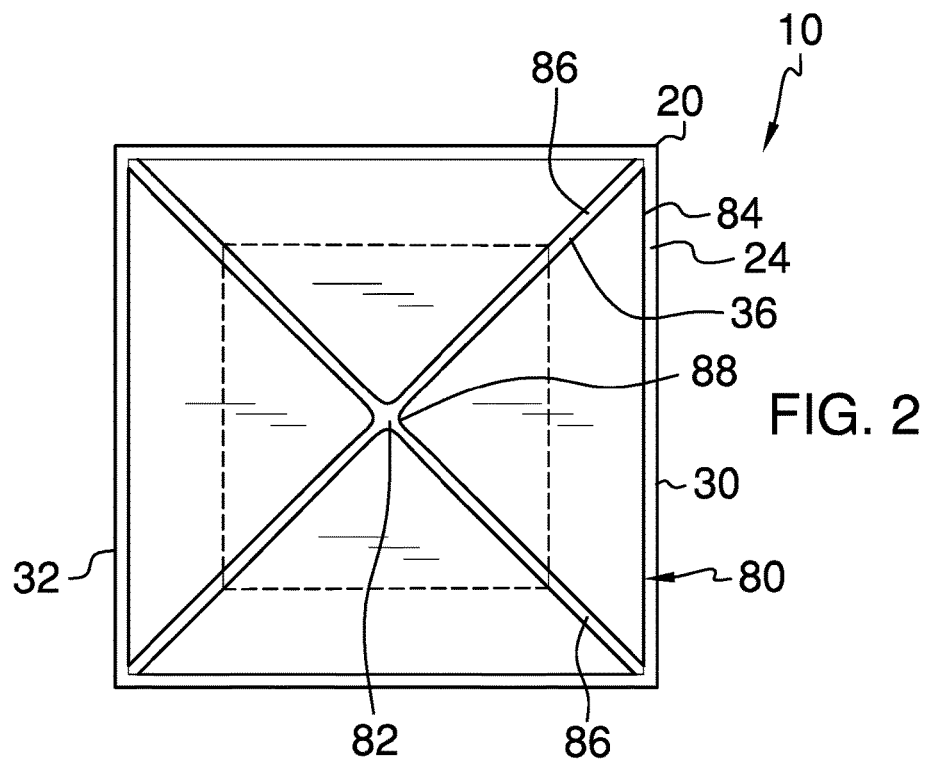
FIG. 2 is a rear elevation view.
Figure 3:
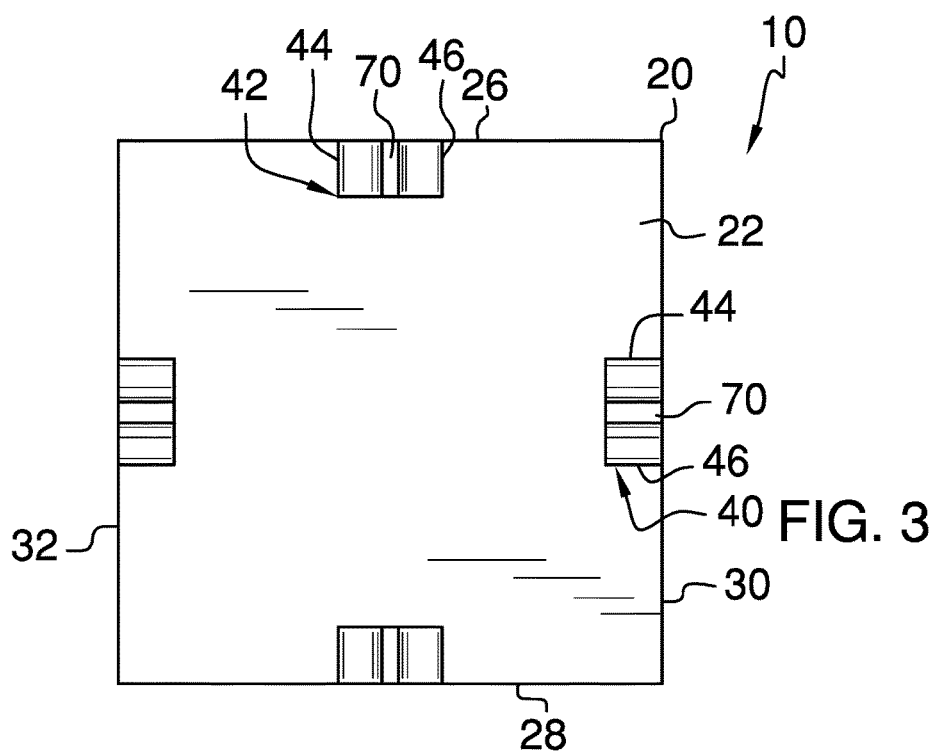
FIG. 3 is a front elevation view.
Figure 4:
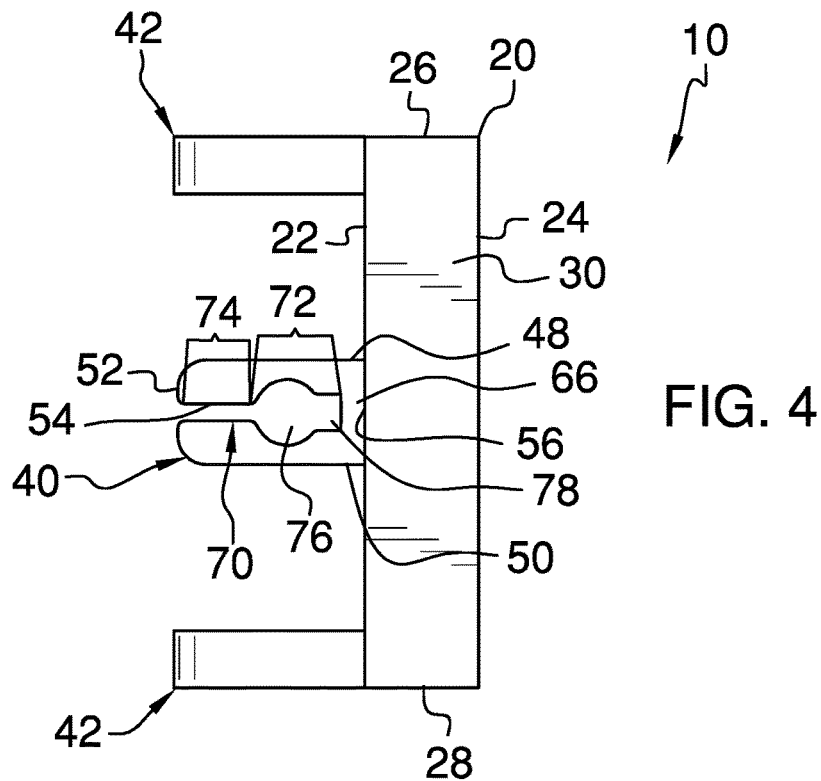
FIG. 4 is a side elevation view.
Figure 5:
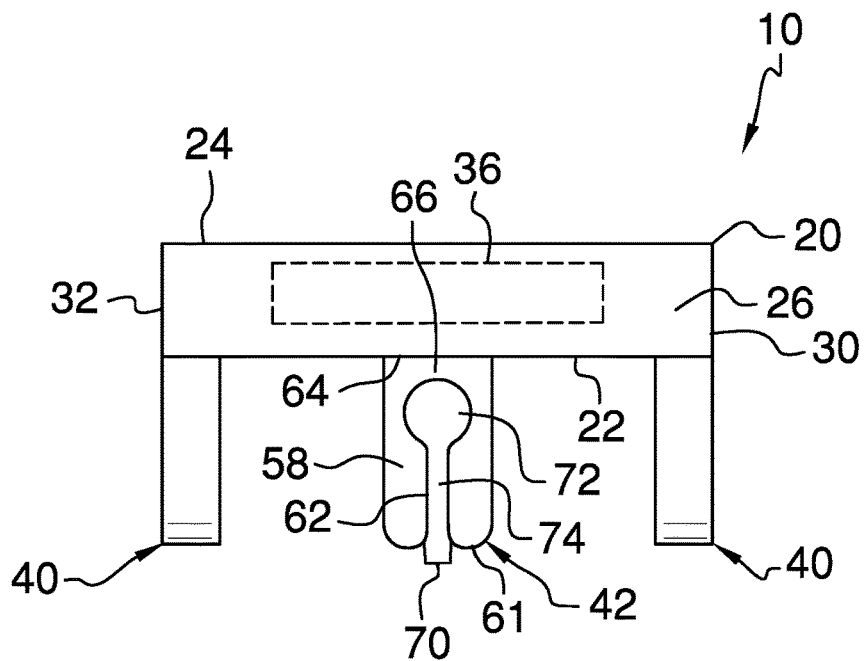
FIG. 5 is a top plan view.

A resilient retainer 80 is disposed on the rear side 24 of the base 20. The resilient retainer 80 has a central opening 82 therein, a plurality of resilient flaps 84, and a slit 86 between each of the resilient flaps. The resilient retainer 80 is sized and is configured to secure the magnet 36 therein. The central opening 82 is configured to receive the magnet 36 therethrough. The resilient retainer 80, as shown in FIG. 2, is a tetraflexagon defined by rear side 24 of the base 20, the plurality of resilient flaps 84, and the slit 86 between each of the resilient flaps 84 with each of the plurality of resilient flaps 84 being a triangle and having a central apex 88 disposed directly adjacent the central opening 82. The resilient retainer 80 has substantially a same surface area as a surface area of the rear side 24 of the base 20. The term resilient as employed herein means having the ability to return into an original position and an original shape after being bent.

What is claimed is:

1. A magnetic light strand clip device comprising:
   a base having a front side, a rear side, a top side, a bottom side, a right side, and a left side, the base having a removable magnet centrally disposed therein, the base being configured to couple to and uncouple from a metal surface;
   a pair of U-shaped first clips disposed on the front side, one of each of the pair of first clips centrally disposed proximal the respective right side and left side of the base, the pair of first clips being aligned with each other;
   a pair of U-shaped second clips disposed on the front side, one of each of the pair of second clips disposed proximal the respective top side and bottom side of the base, the pair of second clips being aligned with each other, each of the pair of first clips and the pair of second clips having a first arm perpendicular to the front side, a second arm parallel to the first arm, each of the first clips having an upper side, a lower side parallel to the upper side, a forward side, an interior side, and a rearward side, each of the second clips having an upper end, a lower end parallel to the upper end, a forward end, an interior end, and a rearward end, a connection segment disposed between the first arm and the second arm of each of the pair of first clips and the pair of second clips at the respective rearward side and rearward end thereof, the upper side of each of the second clips being parallel to the top side of the respective base;
   a central slot continuously disposed along the respective interior side and interior end of the first arm and the second arm in a position between the respective forward side and forward end of each of the first arm and second arm and the connection segment of each of the pair of first clips and the pair of second clips, the central slot having a rear portion directly adjacent the connection segment and a front portion continuously disposed between the respective forward side and forward end and the rear portion, the rear portion and the front portion of the central slot of each of the first clips being open from the right side to the left side, the rear portion and the front portion of the central slot of each of the second clips being open from the top side to the bottom side;
   wherein the front portion of the central slot each of the pair of first clips has a width greater than a width of the front portion of the central slot of each of the pair of second clips;
   wherein the rear portion of each of the pair of second clips is circular;
   wherein the rear portion of each of the pair of first clips has a circular external portion directly adjacent the front portion and a rectangular internal portion, wherein the rear portion of each of the pair of second clips has a diameter greater than a diameter of the external portion of the rear portion of each of the pair of first clips; and
   wherein the base is repositionable upon the metal surface from a first position to a second position, wherein the top and bottom sides are oriented horizontally on the metal surface in the first position, wherein the top and bottom sides are oriented vertically on the metal surface in the second position.

2. The magnetic light strand clip device of claim 1 comprising:

a resilient retainer disposed on the rear side of the base, the resilient retainer having a central opening therein;

wherein the central opening is configured to receive the magnet therethrough; and wherein the resilient retainer is sized and is configured to secure the magnet therein.

3. The magnetic light strand clip device of claim 1 wherein the magnet has a length at least one-half of a length of the top side of the base and a width at least one-half of a width of the top side.

4. The magnetic light strand clip device of claim 2 wherein the resilient retainer has substantially a same surface area as a surface area of the rear side of the base.

5. The magnetic light strand clip device of claim 2 wherein the resilient retainer comprises:

a plurality of resilient flaps; and a slit between each of the resilient flaps.

6. The magnetic light strand clip device of claim 5 wherein the resilient retainer is a tetraflexagon defined by rear side of the base, the plurality of resilient flaps, and the slit between each of the resilient flaps, wherein each of the plurality of resilient flaps is a triangle and has a central apex disposed directly adjacent the central opening.

7. A magnetic light strand clip device comprising:

a base having a front side, a rear side, a top side, a bottom side, a right side, and a left side, the base having a removable magnet centrally disposed therein, the base being configured to couple to and uncouple from a metal surface, wherein the magnet has a length at least one-half of a length of the top side of the base and a width at least one-half of a width of the top side;

a pair of U-shaped first clips disposed on the front side, one of each of the pair of first clips centrally disposed proximal the respective right side and left side of the base, the pair of first clips being aligned with each other;

a pair of U-shaped second clips disposed on the front side, one of each of the pair of second clips disposed proximal the respective top side and bottom side of the base, the pair of second clips being aligned with each other, each of the pair of first clips and the pair of second clips having a first arm perpendicular to the front side, a second arm parallel to the first arm, each of the pair of first clips having an upper side, a lower side parallel to the upper side, a forward side, an interior side, and a rearward side, each of the second clips having an upper end, a lower end parallel to the upper end, a forward end, an interior end, and a rearward end, a connection segment disposed between the first arm and the second arm of each of the pair of first clips and the pair of second clips at the respective rearward side and rearward end thereof, the upper side of each of the second clips being parallel to the top side of the respective base;

a central slot continuously disposed along the respective interior side and interior end of the first arm and the second arm in a position between the respective forward side and forward end of each of the first arm and second arm and the connection segment of each of the pair of first clips and the pair of second clips, the central slot having a rear portion directly adjacent the connection segment and a front portion continuously disposed between the respective forward side and forward end and the rear portion, the rear portion and the front portion of the central slot of each of the first clips being open from the right side to the left side, the rear portion and the front portion of the central slot of each of the second clips being open from the top side to the bottom side;

a resilient retainer disposed on the rear side of the base, the resilient retainer having a central opening therein, a plurality of resilient flaps, and a slit between each of the resilient flaps;

wherein the front portion of the central slot of each of the pair of first clips has a width greater than a width of the front portion of the central slot of each of the pair of second clips;

wherein the rear portion of each of the pair of second clips is circular;

wherein the rear portion of each of the pair of first clips has a circular external portion directly adjacent the front portion and a rectangular internal portion, wherein the rear portion of each of the second clips has a diameter greater than a diameter of the rear portion of each of the first clips;

wherein the base is repositionable upon the metal surface from a first position to a second position, wherein the top and bottom sides are oriented horizontally on the metal surface in the first position, wherein the top and bottom sides are oriented vertically on the metal surface in the second position;

wherein the central opening is configured to receive the magnet therethrough; and wherein the resilient retainer is sized and is configured to secure the magnet therein.

8. The magnetic light strand clip device of claim 7 wherein the resilient retainer is a tetraflexagon defined by rear side of the base, the plurality of resilient flaps, and the slit between each of the resilient flaps, wherein each of the plurality of resilient flaps is a triangle and has a central apex disposed directly adjacent the central opening.

9. The magnetic light strand clip device of claim 7 wherein the resilient retainer has substantially a same surface area as a surface area of the rear side of the base.

10. The magnetic light strand clip device of claim 8 wherein the resilient retainer has substantially a same surface area as a surface area of the rear side of the base.

* * * * *